United States Patent [19]
Dolan et al.

[11] 4,455,562
[45] Jun. 19, 1984

[54] CONTROL OF A LIGHT EMITTING DIODE ARRAY

[75] Inventors: Donald T. Dolan, Ridgefield; Henry Stalzer, Danbury, both of Conn.

[73] Assignee: Pitney Bowes Inc., Stamford, Conn.

[21] Appl. No.: 292,985

[22] Filed: Aug. 14, 1981

[51] Int. Cl.³ ............................................. G01D 15/14
[52] U.S. Cl. ................................ 346/154; 346/107 R; 346/160
[58] Field of Search ................ 346/107 R, 153.1, 154, 346/160; 358/298, 299

[56] References Cited

U.S. PATENT DOCUMENTS

| | | | |
|---|---|---|---|
| 3,803,631 | 4/1974 | Nucklos et al. | 346/107 R X |
| 3,952,311 | 4/1974 | Lapeyre | 346/107 R X |
| 3,988,742 | 10/1976 | Meier et al. | 346/107 R |
| 4,107,687 | 7/1977 | Pfeifer et al. | 346/107 R |
| 4,386,272 | 5/1983 | Check, Jr. et al. | 346/108 X |

OTHER PUBLICATIONS

Koebiltz, Technology of Asynchronous Ink Jet Printing, Second International Conference on Electrophotography, pp. 179-183, Oct. 24-27, 1973.

*Primary Examiner*—Thomas H. Tarcza
*Attorney, Agent, or Firm*—Peter Vrahotes; Albert W. Scribner; William D. Soltow, Jr.

[57] ABSTRACT

This invention relates to circuitry for non-impact printers that use light emitting diodes (LED's) to produce an image on a photoconductor and for controlling the output of each LED of a light emitting diode array that is part of the printer. A binary weighted duty cycle control is used to obtain substantial uniformity in the light emitted from each LED. The binary cycle is time related so that through use of a four-bit code, sixteen outputs are available which yield sixteen periods during which an LED may be enabled.

10 Claims, 5 Drawing Figures

CONTROL OF A LIGHT EMITTING DIODE ARRAY

BACKGROUND OF THE INVENTION

Light emitting diodes (LED's) are coming into considerable use in a variety of fields and for different purposes. For example, in postage meters light emitting diodes are used as opto-isolators to convey a signal to a secured area where use of conventional wiring would be impractical. Another use is in zero crossing detector circuits wherein light emitting diodes are used to trigger a gate such as a thyristor. These are two uses that provide isolated control of a function. Another use of LED's is for the purpose of erasing residual charge on the photoconductor of a copier as is disclosed in U.S. Pat. No. 4,255,042. In none of these examples is there a need for uniformity of the intensity of the light being emitted. There are uses of LED's where the uniformity of light intensity or the amount of light incident upon a surface is a factor. As an example, where an LED array is utilized is as a printer that creates an image on a photoconductor which is to be subsequently developed, it is important that all the LED's emit light of substantially the same energy so that an essentially uniform charge is created on the photoconductor. This may be accomplished by having uniform light intensity emitted by each LED or by individually varying the time the LED's are enabled inversely to their respective light intensity.

SUMMARY OF THE INVENTION

The instant invention is directed to non-impact printers and more specifically to a printer using a light emitting diode (LED) array. Provision is made for controlling the amount of light emitted from individual light emitting diodes of the LED array of the printer so that the energy emitted by each of the diodes may be maintained within a given range or so that the output of each may be controlled to achieve a given purpose. An example of such a purpose is to produce images on a photoconductor which is made up of dots of various sizes. The present invention is concerned with the use of a binary control system to effect such results. This may be accomplished through a system using four tri-state outputs of a latch integrated circuit connected to a driver that controls each light emitting diode. With these four tri-state devices, sixteen levels of intensity may be achieved. The system involves the use of a steady current which is time controlled, the amount of light or energy from each individual LED being directly related to the period for which current is supplied to such LED.

BRIEF DESCRIPTION OF THE DRAWING

FIG. 5 is a representation of the current waveforms that may be produced by the control system shown in FIGS. 3 and 4.

DETAILED DESCRIPTION OF THE PREFERRED EMBODIMENT

Figure 1:
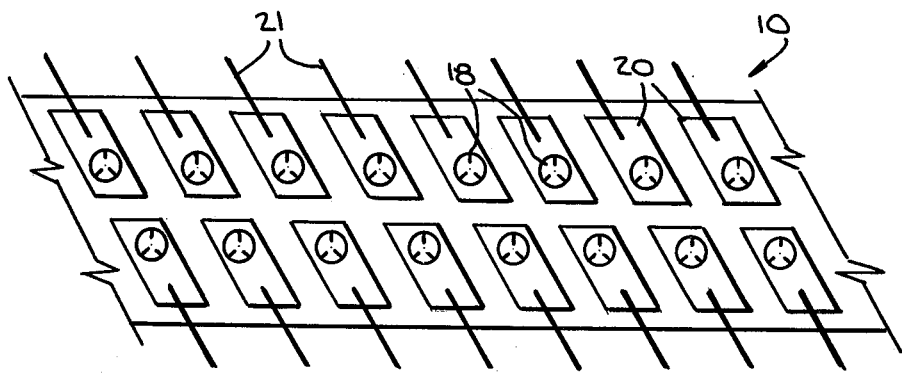
FIG. 1 shows a plan view of a partial array of light emitting diodes.
Figure 2:
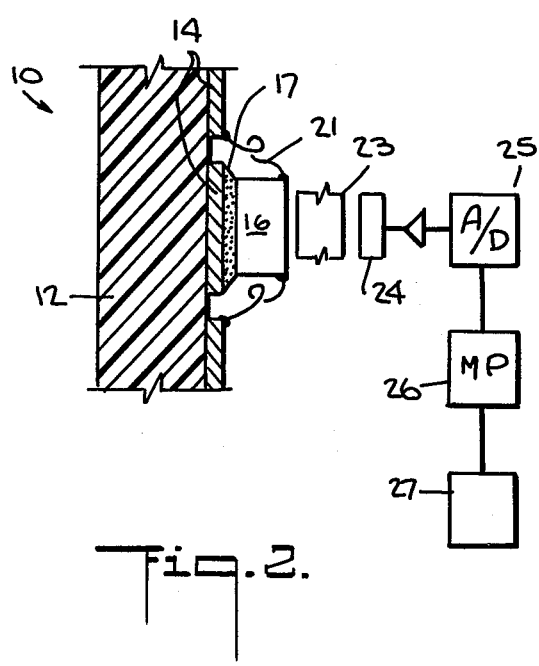
FIG. 2 is a cross-sectional view of one of the light emitting diode sites in FIG. 1 shown with an optional light measurement system.

Referring initially to FIGS. 1 and 2 of the drawing, an array of light emitting diodes (LED's) is shown generally at 10. The array 10 includes a substrate 12 made of a dielectric material such as aluminum oxide ($Al_2O_3$) with conductive strips 14 applied to portions of one surface thereof. A plurality of N type monoliths 16 are attached to one of the conductive strips 14 by an adhesive 17 such as silver epoxy. The monoliths 16 may be made of a material such as galium arsenide and doped at a number of locations to create p-type sites 18 which in combination with their associated monolith define light emitting diodes. The p-type sites of the LED's 18 are located along two rows, each of which is adjacent a longitudinal side of the monolith 16. Although the LED sites are shown as being circular, it will be appreciated that non-circular sites, such as elliptical, may be fashioned for occasions when non-circular resolution is required. A metallic coating 20 is deposited upon the monolith 16 at the location of each of the LED sites 18, an open portion being formed in each metallic coating to expose the LED's to allow light to be emitted therefrom. Anode leads 21 provide electrical connection between two of the conductive material strips 14 and the metallic coatings 20 so as to allow the supply of power to each LED 18. Cathode return leads 22 (see FIG. 3) are connected to the conductive strips 14 to which the monolith 16 is attached to complete the LED circuit. Imaging optics 23 are placed adjacent the LED sites 18 so as to convey the light emitted from each LED to any suitable surface 24 such as a photoconductive surface upon which an image may be created by exposure to the LED's. As shown in FIG. 2, the surface 24 optionally may be a photocell that is used for the purpose of measuring the intensity of light emitted by each LED 18 by placing the same in front of each LED one at a time and receiving light emitted therefrom. The photocell may be connected to an analog to digital converter 25 which in turn is connected to a decision making device such as a microprocessor 26. This device 26 would receive a signal from the converter 25 which is indicative of the light intensity of an LED 18 whose light intensity output is being measured and would decide the amount of time such LED would have to be enabled to emit a standard amount of energy. This information would then be supplied to a truth table 27. When the surface 24 is a charged photoconductive surface, enabling an LED will create a latent electrostatic image of a dot on the photoconductor. This dot will be a small area that is of lesser charge than the background or balance of the charged photoconductor and an image is created by a multiplicity of such dots fashioned in a controlled manner. After the image is created, the same may be developed using a reverse development technique as is well known in the art.

Figure 3:
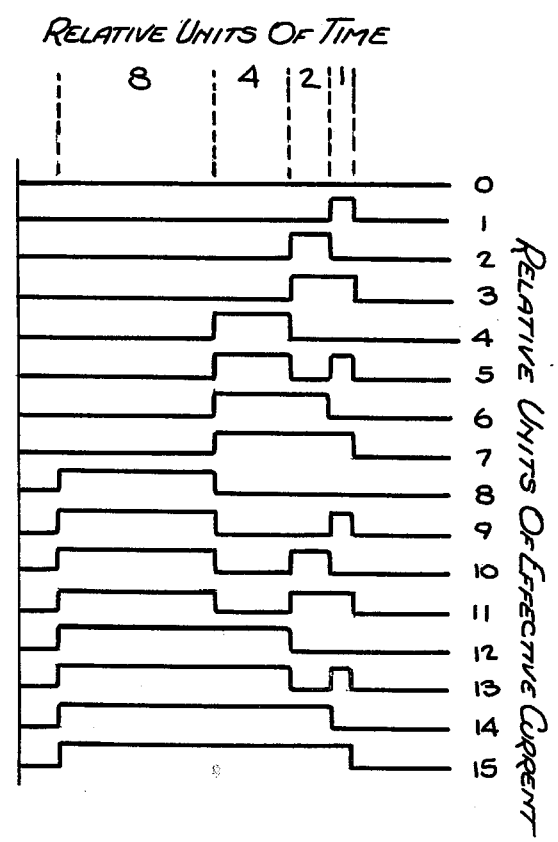
FIG. 3 is a diagram of the control system that is used to control the period for which light is emitted from diodes in the array shown in FIG. 1.
Figure 3:
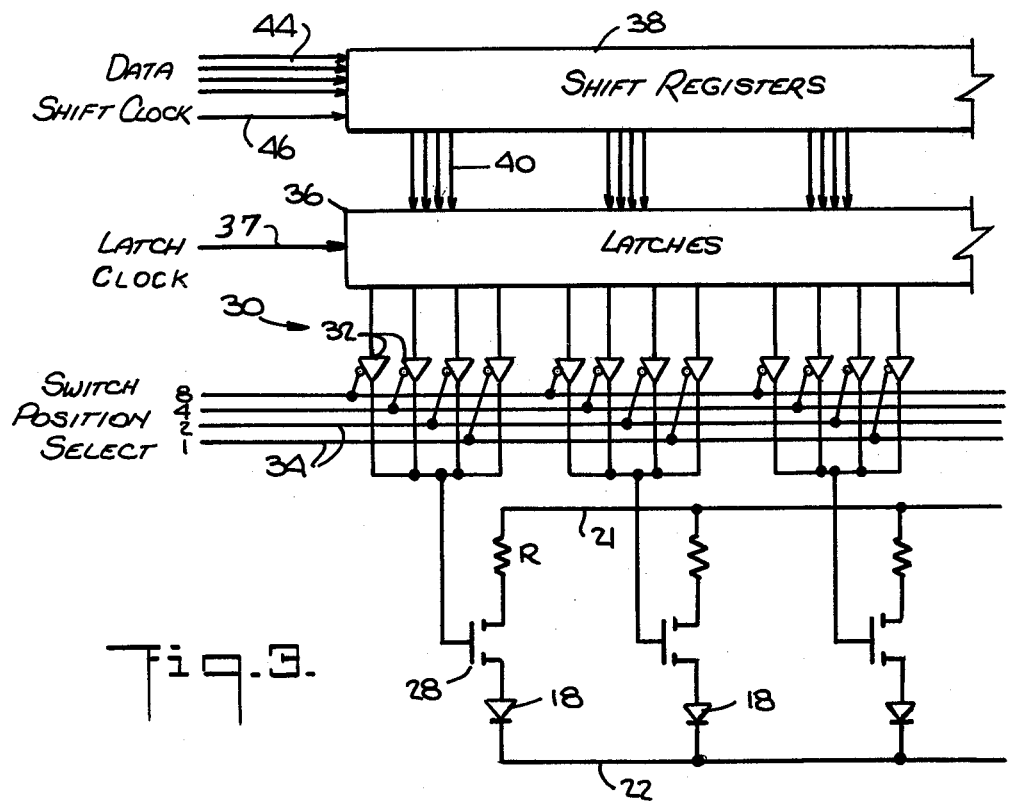

Referring now to FIG. 3, the LED's 18 are shown connected in parallel to the leads 21, 22 and to a resistor R through a driver 28 located at the junction between an LED and a resistor R. Each driver 28 is connected to an integrated circuit 30, the circuit 30 having a plurality of tri-state buffers 32 separated into groups of four. Each LED 18 is connected through its respective driver 28 to a group of tri-state buffers 32 each of which contacts one of four buses 34. The four buses 34 each supplies an equal amount of power for a different amount of time in accordance with a binary value 8, 4, 2 or 1, the number indicating the time for which the respective bus will gate a given buffer 32. These time sequences are illustrated in FIG. 5. The buffers 32 are connected to latches 36, there being a lead connecting an individual latch to an individual buffer 32 of each group. The latches 36 in turn are connected to a latch clock 37 and to shift registers 38 through leads 40. Data input leads 44 and a clock lead 46 are connected to the shift registers 38. Data is supplied serially to the shift registers 38 with each clock pulse until the registers are filled. With the next clock pulse, the data in the registers 38 will be supplied in parallel to the latches 36. The latches 36 then provide information to the buffers 32 which are selectively enabled through busses 34 to enable the drivers 28 for selective periods. More specifically, the latches will provide either a "1" or "0" to each of the buffers 32 of a group when the information is clocked. The busses 34 will then sequentially gate each buffer 32 of the group in turn for an unequal length of time, the first buffer being gated for 8 units of time, the second buffer for 4 units of time, etc. If a latch impresses a "1" upon a buffer 34, than that buffer will be gated the length of time afforded by its associated bus 34, but if the latch impresses a "0" upon the buffer, the output will be zero. For example, if the buffers 32 connected to the "2" and "4" busses 34 are impressed with "1" by their respective latches 36, and the buffers 32 connected to the "8" and "1" busses are impressed with "0's" by their respective latches, the LED 18 will be enabled for six units of time. The same will occur with each group of buffers 32, the combination of 0's and 1's being impressed by the latches being governed by the intensity characteristics of the associated LED 18 in accordance with the information stored in the PROM 54.

The shift registers 38 and latches 36 used are CMOS integrated circuits with an MOS high current transistor at the output to produce the high current levels to the LED's. Such a choice produces a simple circuit. It is to be understood that bi-polar logic, such as TTL, can also be used, in which a bi-polar transistor would be used to produce the high current levels.

Figure 4:
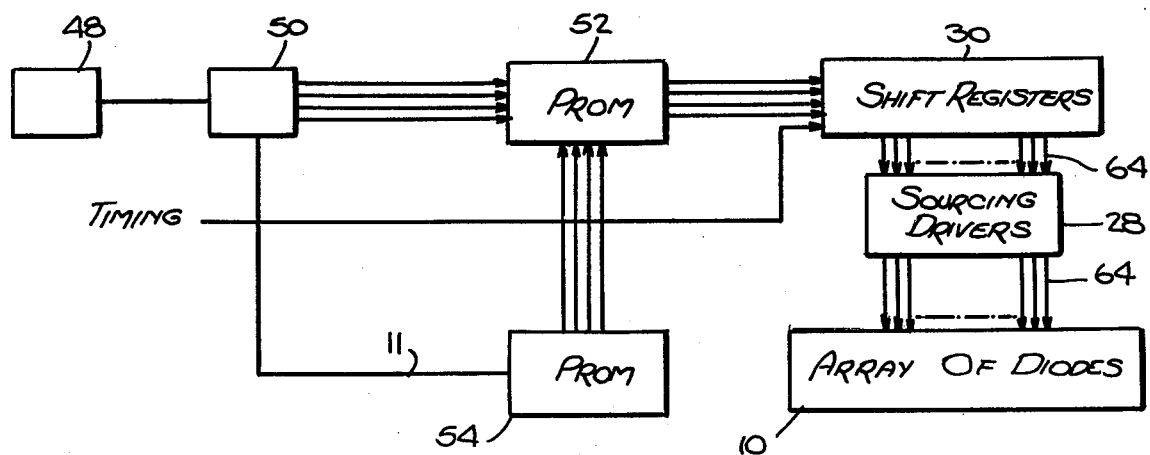
FIG. 4 is a block diagram of the system used to control the amount of energy emitted from the diodes in accordance with the instant invention.

Referring now to FIG. 4, an overall description of the system is disclosed in block diagram form. A host computer 48 which is connected to a character generator 50. The host computer 48 is provided to convey the necessary intelligence or commands relative to the text or characters to be reproduced. Such host computers are well known, see for example U.S. Pat. No. 3,737,852, but does not form part of the invention herein. For this reason, details will not be given as to the functioning of such computers. The character generator 50 in response to the information from the computer 48 will determine the location and arrangement of the character to be produced. Such characters are generated by a plurality of signals each of which will, in this preferred embodiment, produce a dot on the photoconductor 23. Each signal that will produce a dot is fed to a PROM 52 and eventually onto the shift registers 30. The PROM 52 is a constant prom which with additional information will provide the proper power output from each LED 18 so that uniform dot sizes will be created. The dot location information is supplied to a second PROM 54 which is a variable prom and which has been programmed by the truth table 27 so that it is able to supply the first PROM 52 with information relative to the intensity characteristic of the light emitting diode being enabled.

One use of the LED array 10 and the accompanying control thereof is in a non-impact printer wherein the LED array 10 creates an image on a charged photoreceptor. In the standard copier process, a photoconductor is charged with a given polarity, is exposed to light reflected from an original to be copied thereby discharging the photoconductor in all areas except for an image of the text or pattern to be reproduced. The image is then developed with a toner having a charge opposite to the charge of imaged areas. In an LED printer, a slightly different sequence is involved. The surface of a photoconductor 24 is charged and such charged surface is exposed to an LED array 10. In order to produce the desired text or pattern, the individual LED's 18 are enabled as required. This enabling is controlled by the host computer 48 which commands the character to be produced at a given location of the photoconductor. The character generator 50 receives the command from the host computer 48 and acts as a look-up table that provides the PROM 52 with the size of dot to be produced. It will be appreciated that characters produced from a plurality of dots may have dots of different sizes with those dots along the edges and at selected locations of the character being smaller than those in the interior of the character. In this manner, a more linear appearance is obtained along the perimeter of the character. The character generator determines the different sizes for dots for each character stored. The PROM 54, which has been programmed by the truth table 27, is given by the character generator 50 the location when a dot is to be produced and conveys to the PROM 52 the strength of the LED involved which would be enabled to produce such dot. The resulting image will be created from a multiplicity of dots which are so closely arranged that they give the appearance of a solid form to the eye.

With regard to the forming of the dots, the characterstics of each dot must be considered. LED's having the same rating will have a variance in performance characters of as much as two to one. More specifically, when the same current is supplied to LED's having the same rating, a different quantity of energy will be emitted by the LED's, such energy having a variance of a factor of two. If all the LED's of an array were to be enabled over identical periods, because of the variance in output characters, the dot sizes of the image would differ in accordance with such variance. Obviously, it generally would be desirable to have uniform dot sizes. The size of a dot being produced is controlled by the amount of energy incident upon the surface of a charged photoreceptor. Consequently by controlling either the intensity of light emitted from an LED or the time the LED is enabled, the dot size created by each LED can be controlled. Since the intensity of light emitted by a particular LED is inherent and therefor uncontrollable, a suitable manner in which the dot size can be controlled is by varying the duration during which a LED is enabled to form a dot, the length of time being inversely proportional to the intensity. In order to accomplish this, the output of each LED is measured and permanently stored in PROM 54 and the tri-state buffers 32 are controlled so that the duration power is supplied to an LED by the busses 34 is chosen on an individual basis so that the dot sizes created on a photoconductor are effectively uniform. It will be appreciated that the buffers 32 may be multiplexed so as to reduce the number of buffers required to control the power to the LED array 10.

The choice of four data bits is not inherent in this invention. It was dictated by the desire to produce eight exposure levels for each LED of an array of diodes whose intrinsic output may vary by two-to-one as stated previously. The four data bits allow a range of sixteen different time averages for drive currents to the LEDs. Half of this range may be used to correct for the intrinsic LED intensity variation as previously discussed. The other half may be used to achieve variable dot size as well as to correct variation. As previously stated, in the forming of characters using dots, edge fuzziness results if all the dots are the same size. By producing small dots in selected locations at the edges of a character, a degree of smoothness is perceived. This may be accomplished by using the first half of the data bit range to produce small dots of uniform size and using the upper range to produce large dots of uniform size. To produce a maximum exposure, the most efficient LED will be driven with only eight of the sixteen time units of average current to produce a large dot and the least efficient LED (not less than one-half as efficient) will be driven with all sixteen units of average current. It can be seen that this principle can be expanded to more bits if desired, to account for larger LED to LED variations and to produce additional exposure levels.

I claim:

1. A method of reducing the effects of diode-to-diode variation in the output of individual light emitting diodes formed in an array to obtain substantially uniform energy output on an individual basis, the steps comprising: providing a plurality of light emitting diodes in a linear array, measuring the light intensity emitted from each diode when it is enabled to obtain the intensity characteristic of each diode, storing information relative to the intensity characteristics of the diodes, connecting each of the light emitting diodes to an enabling means, connecting said enabling means to timing means capable of enabling said enabling means for one of a plurality of periods, and selecting the period or a combination of periods in response to the stored information relative to intensity characteristics to provide a substantially uniform energy output for each of the light emitting diodes of the array.

2. An apparatus for controlling the output of individual light emitting diodes formed in an array to obtain a substantially uniform energy output from each of the diodes of the array, comprising: means for providing a plurality of light emitting diodes, means for connecting each of the light emitting diodes to a selectable enabling means, means for storing information relative to the light intensity characteristic of each light emitting diode, and control means connected to said storing means for controlling the period during which said enabling means enables the diodes, said control means having a plurality of periods, said storing means providing information to said control means for determining the period or a combination of said periods during which a diode is to be enabled in response to the light intensity characteristic of said diodes to produce a substantially uniform energy output from each of the diodes.

3. In a non-impact printer of the type where an array of light emitting diodes is placed in front of a photoconductor to create an image on the photoconductor by selectively enabling the light of emitting diodes, the combination comprising: means for supplying intelligence, a character generator connected to said intelligence supply means to receive commands therefrom, a first PROM connected to said character generator, a second PROM connected to said character generator and to said first PROM, an integrated logic circuit connected to said first PROM, a timer connected to said integrated logic circuit, and a plurality of drivers connected to said integrated circuit, said drivers being connected to the light emitting diodes to enable the same in response to signals from the integrated circuit.

4. In a non-impact printer of the type where an array of light emitting diodes is placed in front of a photoconductor to create an image on the photoconductor by selectively enabling the light emitting diodes, the combination comprising: a source of intelligence for supplying information to be reproduced by the printer, a character generator connected to said intelligence source to receive commands therefrom which determines the location and arrangement of a character to be generated, a first PROM connected to said character generator to control the enabling of each light emitting diode, a second PROM connected to said character generator and to said first PROM to convey to the first PROM the characteristic of a light emitting diode to be enabled, a logic circuit connected to said first PROM, a timer connected to said logic circuit, and a plurality of drivers connected to said logic circuit and to the light emitting diodes.

5. The printer of claim 4 wherein said logic circuit comprises shift register means in connection with said first PROM and said timer, latch means connected to said shift register, and switch means connected to said latch means and to said timer.

6. The printer of claim 5 wherein said timer comprises a shift clock connected to said shift register means, a latch clock connected to said latch means, and a gating means connected to said switch means.

7. The printer of claim 6 wherein said switch means comprises a plurality of buffers connected to said latch means and to a light emitting diode and wherein said gating means comprises a plurality of busses, one of each of said busses being connected to said buffer to sequentially gate each buffer a different period.

8. In a non-impact printer of the type where an array of light emitting diodes is placed in front of a photoconductor to create an image on the photoconductor by selectively enabling the light emitting diodes, the combination comprising: a source of intelligence for supplying information to be reproduced by the printer, a character generator connected to said intelligence source to receive commands therefrom which determines the location and arrangement of a character to be generated, a first PROM connected to said character generator to determine the duration each light emitting diode is to be enabled, a second PROM connected to said character generator and to said first PROM to convey to the first PROM the intensity characteristic of a light emitting diode to be enabled, timing means, a logic circuit connected to said first PROM and said timing means, gate means controlled by said timing means, and a plurality of switch means connected to said logic circuit, to said gate means and to the light emitting diodes, whereby said logic means selects those switch means that are to be turned on in response to said first PROM and said gate means gates all said switch means to turn on said selected ones of said gate means.

9. A method of controlling the output of individual light emitting diodes formed in an array that addresses a charged photoreceptor so as to produce thereon images of characters each of which is composed of a multiplicity of dots, the steps comprising: providing a plurality of light emitting diodes in a linear array, connecting each of the light emitting diodes to an enabling means, connecting said enabling to timing means capable of causing said enabling means to enable said light emitting diodes for one or a plurality of periods, supplying a charged photoreceptor, placing the array in a position so that the light emitting diodes address the photoreceptor and supplying information to the enabling means relative to the location of dots required to produce an image of selected characters on the photoreceptor and supplying information to the timing means relative to the size of dots required to produce characters having smooth edges by providing the edges of the character images with smaller dots than those dots in the interior of the character.

10. An apparatus for controlling the output of individual light emitting diodes formed in an array that addresses a charged photoreceptor so as to produce thereon an image of characters comprising: means for providing a plurality of light emitting diodes, means for connecting each of the light emitting diodes to a selectable enabling means, means for storing information relative to the location of dots and sizes of dots required to provide characters having smoothed edges and control means connected to said information storing means for controlling the period during which said enabling means enables the diodes, whereby said information storing means is operative to provide information to said control means for determining the period during which said light emitting diodes are to be enabled to produce images of characters having smoothed edges on said photoreceptor and and said emitting means enables said light emitting diodes in response thereto.

* * * * *